United States Patent
Scarborough

(10) Patent No.: US 8,465,038 B2
(45) Date of Patent: Jun. 18, 2013

(54) LEVER ENHANCED PEDALING SYSTEM WITH WRAP AROUND CHAIN PROPULSION SYSTEM

(75) Inventor: Rashad Na'im Scarborough, Durham, NC (US)

(73) Assignee: Rashad Na'im Scarborough, Durham, NC (US)

( * ) Notice: Subject to any disclaimer, the term of this patent is extended or adjusted under 35 U.S.C. 154(b) by 118 days.

(21) Appl. No.: 13/136,745

(22) Filed: Aug. 9, 2011

(65) Prior Publication Data

US 2012/0086182 A1    Apr. 12, 2012

Related U.S. Application Data

(60) Provisional application No. 61/401,360, filed on Aug. 11, 2010.

(51) Int. Cl.
*B62M 1/04* (2006.01)
*B62M 1/28* (2006.01)

(52) U.S. Cl.
CPC ................................ *B62M 1/28* (2013.01)
USPC ............................................... 280/253

(58) Field of Classification Search
USPC ............................... 280/252–258
See application file for complete search history.

(56) References Cited

U.S. PATENT DOCUMENTS

| | | | | |
|---|---|---|---|---|
| 5,236,211 | A * | 8/1993 | Meguerditchian | 280/241 |
| 5,551,718 | A * | 9/1996 | Toronto et al. | 280/252 |
| 5,833,257 | A * | 11/1998 | Kohlheb et al. | 280/251 |
| 5,876,053 | A * | 3/1999 | Ray | 280/252 |
| 6,173,986 | B1 * | 1/2001 | Sicher | 280/647 |
| 6,609,724 | B1 * | 8/2003 | Dzvonik | 280/288.1 |
| 6,749,211 | B1 * | 6/2004 | Yliniemi | 280/254 |
| 7,510,201 | B2 * | 3/2009 | Scarborough | 280/253 |
| 7,600,771 | B2 * | 10/2009 | Miller et al. | 280/252 |
| 8,215,654 | B1 * | 7/2012 | Leser | 280/252 |
| 2003/0193159 | A1 * | 10/2003 | Ridenhour | 280/255 |
| 2006/0066072 | A1 * | 3/2006 | Scarborough | 280/253 |
| 2007/0228687 | A1 * | 10/2007 | Parker | 280/252 |

* cited by examiner

*Primary Examiner* — Kevin Hurley

(57) ABSTRACT

A propulsion system of a lever propelled bicycle that utilizes a right and left side assembly consisting of two sets of linear chain links with an offset connection to one another by a spacer means, wherein each assembly is able by said spacer connection means to wrap around separate radial drive members at least 1¾ revolutions without wrapping around itself, therefore providing the rotational pulling means of it's connected radial drive member with a propulsion that is consistent in range and torque. The propulsion system also provides means of rewrapping each chain assembly around its radial drive member for reciprocal rotational pulling action by alternate levers when a rider applies force to each pedal.

4 Claims, 12 Drawing Sheets

SECTION BB

SECTION CC

LEVER ENHANCED PEDALING SYSTEM WITH WRAP AROUND CHAIN PROPULSION SYSTEM

This application is a Continuation-In-Part application of Ser. No. 61/401,360, filed on Aug. 11, 2010.

BACKGROUND OF THE INVENTION

1. Field of Invention

This invention relates to the propulsion system's of lever propelled bicycles.

2. Background of the Invention

In the bicycle industry, there are the alternative types of bicycles that are propelled by lever machines, which pivots back and forth, instead of in the conventional manner of the rotational of crank arms. What the Lever Enhanced Pedaling System (LEPS) has to offer is low pedaling resistance. Low pedaling resistance occurs when there is no significant upward force from the bicycles pedaling components, resulting in an increase in torque while pedaling this type of bicycle. The upward force from a conventional bicycle comes from the crank arm being in the 90 degree or near vertical position, resulting in the area of applied force (pedals) coming closer to the fulcrum (crank axle) horizontally distance wise. Thus, the closer the area of applied force is to the fulcrum, the greater the effort there must be to propel the bicycle forward. So one may experience a fluctuation of pedaling force when pedaling a conventional bicycle, after noticing that when the forward pedal of the bicycle is pressed downward while in its 180 degree or near horizontal position, pedaling torque increases. This is because the area of applied force is the most furthest away from the fulcrum. The LEPS, however, maintains its area of applied force at a distance from its fulcrum, that is more constant or in a near linear path (FIG. 2) while the pedals are being pressed downwards. This linear path is not exactly linear, but slightly curved. This curved path is sufficient enough to maintain a near constant level of torque while pedaling this bicycle. This constant level of torque establishes a mechanical advantage that is above that of all conventional bicycles using a rotational pedaling configuration.

Mechanical advantage is not limited to just torque per pedal, but also must include range to torque ratio. In order for a pedaling system to have more mechanical advantage, it must have more torque with equal amount or more pedaling range than the conventional bicycle. This is why the LEPS has adopted a propulsion system with a roller chain that is configured to pull the rear wheel drive component into rotation around the smallest diameter possible. The essential part of this rear wheel drive component that the roller chain pulls is a cylinder 14 (FIG. 4 & FIG. 6) or drive cylinder, which is closely occupied by the axle 18 of the rear wheel. Thus, the sprocket was omitted from this mechanism, because it would reduce the pedaling range of the bicycle due to the nature of its large diameter. This means that the roller chain 2 would rotate the cylinder 14 around the axle 18 of the rear wheel, after it was wrapped around said cylinder (FIG. 6), which would rotate the rear wheel connected to the cylinder.

Experiments were conducted on such a mechanism, which resulted in a sufficient amount of pedaling range, but then a problem remained which had to be solved. When the chain 2 wrapped the cylinder 14 and itself, torque would increase as well as the diameter of the chain's circular position, generating an uneven amount of torque. Thus, a new chain arrangement was invented in order to prevent the chain from wrapping around itself, while facilitating the chain 2 wrapping around the drive cylinder 14 at least 1¾ times. This 1¾ wrap around chain configuration allowed for 1¾ wheel revolutions per pedal, which exceeds performance standards for single speed bicycles. In order for this wrap around chain system 2 to actually work, it would be essential to cut the length of the chain 28 to or near to the circumference of the drive cylinder 14 so it could be wrapped around the drive cylinder 14, while the ends of the chain 28 are almost touching each other. The first end of this chain 28 would have its first chain bore occupied by a steel rod 32, which would be used to fastened this end of the chain to a radial drive disk 24 connected to the drive cylinder 14 by the welding process. Then, the second portion of the chain 30, which continues to wrap around the drive cylinder 14 would be offset in connection to the former chain portion 28. This offset connection would be at the last chain link bore of the first chain 28 mentioned and the first chain link bore of the second chain 30. Both bores would be aligned with a spacer 34 between them the latter's bore aligned as well. Then a steel rod 48 would occupy these bores and be used to fastened the assembly 2 together (FIG. 5B). The spacer 34 would act as a means to prevent the roller chain pins (28 & 30) from colliding with each other while the chain 2 is being wrapped adjacently around the drive cylinder 14. The other end of the second chain member 30 would be connected to the lever machine 46, around the load point 4 and this load would be pulled in a rearward direction. The LEPS's lever machine 46 and reciprocal system 56 has a mechanical design that would make the LEPS wrap around chain propulsion system original and produce new mechanized results due to such an arrangement. For example, the component in U.S. Pat. No. 4,574,649 awarded to Seol has a cable 7 that moves through the grooves of pulley wheels 13 and each end of the cable is attached to a separate roller chain. The LEPS has a cable 8 that moves through four pulley wheels (10 & 22) and each end is directly connected to a radial drive member 26 as well as it's member drive cylinder 14, but not separate roller chains 28. Furthermore, each roller chain 28 is connected to a separate radial drive member 24 that are welded to member drive cylinders 14. This new arrangement results in a drive radius that is smaller than most lever propelled bicycles in its field and this smaller drive radius allows each roller chain assembly 2 to rotate the connected rear wheel at more revolutions per pedal than if a sprocket was used. Each reciprocal cable 8 pulls and rotates it's connected drive cylinder 14, while reeling in it's member roller chain assembly 2.

Another feature that distinguishes the LEPS from Soel's invention is the length of the lever machine 46. The LEPS has the area of applied force (pedals) 42 distance to the load (roller chain connection) 4 more than twice the distance than the load is to the fulcrum in its highest gear and this is why such a mechanized configuration will have more mechanical advantage. Other different features include a reciprocal cable system 56 that moves inside the bicycle's frame 40 instead of on the outside of it. Furthermore, the way the roller chain 30 is connected to the load bolt 4 on its member lever machine 46 is different than the prior art. The chain 30 is partially wrapped around the load bolt 4, while partially overlapping it self (FIG. 5A) in order to adjust tension on the chain 30 after calibrating the reciprocal cable system 56 connected to the drive cylinder 14. Each reciprocal cable end 8 is designed to alternately wrap its member transmission chain assembly 2 while it is being pulled. After tension in the reciprocal cable 8 is established, tension in the roller chain must be established by wrapping the roller chain 2 around the drive cylinder 14 that is not wrapped with the reciprocal cable 8. Then tension on the roller chain 2 should be established by pulling the roller chain 30 around the load bolt 4 until it is tight and bolting the overlap of the chain 30 to its longer portion by inserting bolts 16 (FIG. 5A) in aligned chain link spaces. This connection must then be fastened in place with nuts. The other side of the reciprocal cable 8 should be wrapped around the drive cylinder 14, but the roller chain 2 should be unwrapped around member drive cylinder 14 and tension on this roller chain 2 should be established like the former mentioned roller chain. The reason why tension on the cable 8 and roller chains 2 are important is because tension on such components will allow maximum forward travel per pedal when they engage the drive cylinder 14 or when a rider pedals the bicycle.

The Propulsion mechanism for lever propelled bicycles (U.S. Pat. No. 4,630,839) awarded to Seol has many differences when compared to the LEPS's chain wrap around system that would establish the latter system as original offering novel results. The device invented by Seol has separate transmission chains the pull it's radial drive member in a forward direction in contrast to the LEPS's system, which pulls its radial drive member in a rearward direction. The rearward pull system gives its lever machine more design options, because it lever machine 46 can be lengthened beyond the axle 18 of the rear wheel. This design option allows the LEPS's lever machine 46 to be stretched rearward to increase mechanical advantage without compromising standard wheel base length or ergonomic pedal position. Further differences between the former mentioned invention and the LEPS is the position of propulsion chain engagement. The chain of the former invention has two propulsion chains that engage symmetrical radial members (12 and 12a, FIG. 2) that are connected by the same axle. This chain engagement is close to either pedal when a pedal is in its peak position. This position may be close enough to snag the hem of a rider's pants if it were caught in this engagement. The propulsion chain engagement of the LEPS is within the rear tube of its frame 40, thus making it free from entangling a rider's clothes.

The Lever driven bicycle (U.S. Pat. No. 5,988,662) awarded to Staehlin has various distinctions when compared to the LEPS's system that makes the latter new and unique. The Lever driven bicycle has its fulcrum on the axle of the rear wheel, while the fulcrum 44 of the LEPS is connected to the frame 40 of the bicycle behind the axle 18 of the rear wheel. Having a fulcrum 44 connected to the rear frame 40 has the advantage of easy rear wheel removal for maintenance purposes. After the axle 18 of the LEPS is removed from the rear wheel, the rear wheel can be dropped out for repairs. The Lever driven bicycle would be difficult to repair because the rear reciprocal system would be attached to its lever machine, while the axle is connected to the bore of each symmetrical lever machine composing the fulcrum. Because the axle of the rear wheel is directly and indirectly connected to the frame of this lever propulsion system, is why it would be very difficult to remove this wheel for maintenance. This is why the LEPS's wrap around chain propulsion system will have an advantage over such a system. Furthermore, the reciprocal system of the Lever driven bicycle is too close to the fulcrum. This closeness would generate multiplied pressure from the effort spread out from the longer rigid mass of material composing the lever machine leading the fulcrum. Thus, this pressure may cause the components of the reciprocal system to break down earlier than components of the average bike. The LEPS has a reciprocal system 56 that is further away from its member fulcrum 44, thus the system would last longer.

Objects and Advantages

Accordingly, besides the functional advantages of the LEPS with wrap around propulsion system, various benefits of the present invention include:

(a) a bicycle that is lighter due to more efficient lever machines, lighter components and frame; as well as
(b) A bicycle that has more durable transmission components.

SUMMARY

As expressed in the former paragraphs the LEPS with wrap around chain propulsion system is a new efficiently configuration that allows the rider to pedal the bicycle with more travel distance per pedal, while increasing the torque of the bicycle due to its lighter frame components.

DRAWING

Figures

Figure 5A:
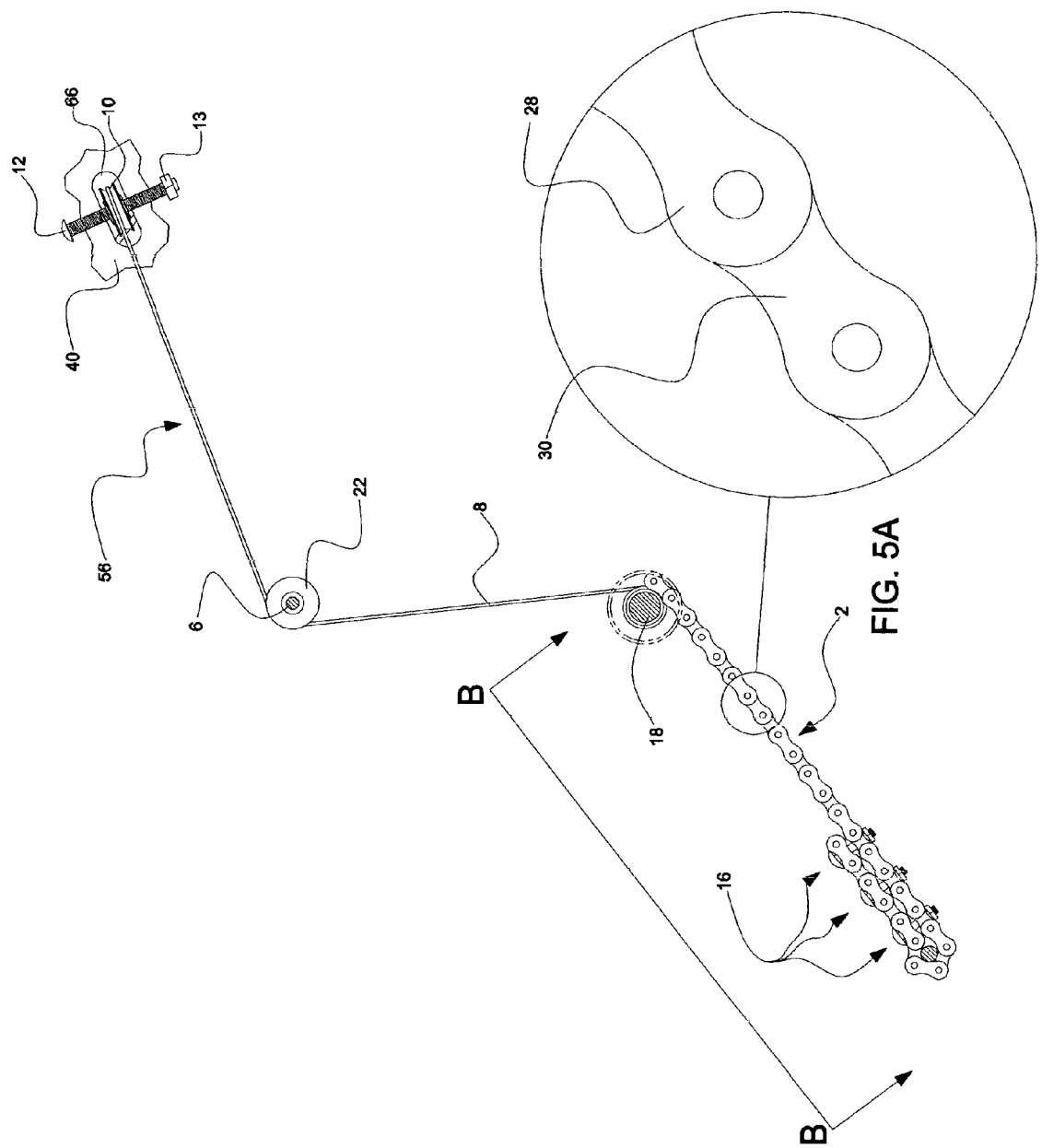
FIG. 5A illustrates an enlarged right side view of the wrap around chain propulsion system's essential mechanical components, which further illustrates the position of the transmission chain 2 before it is wrapped around the drive cylinder 14 and after its pedal is completely pressed down.
Figure 5B:
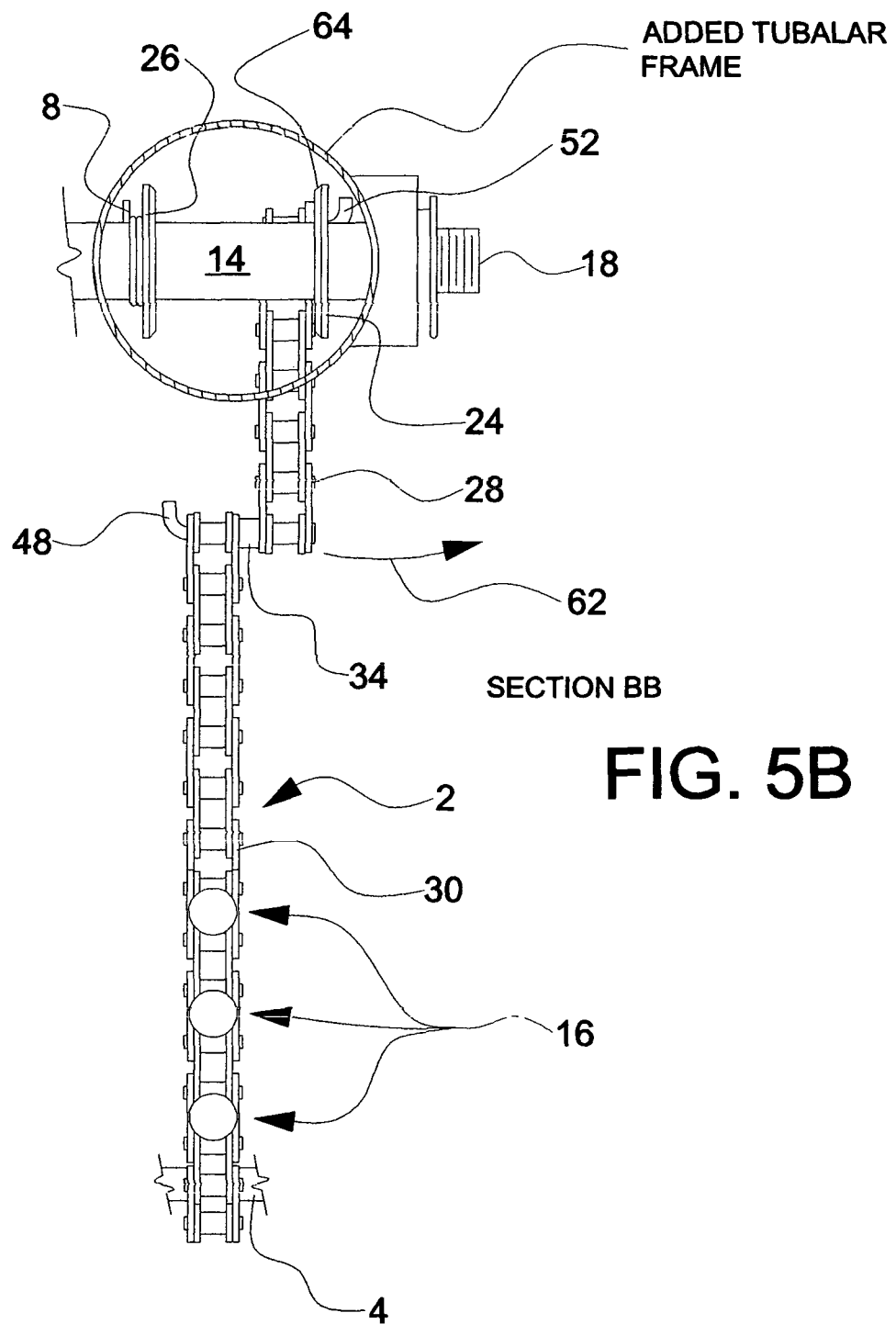

FIG. 5B illustrates the top view of the transmission chain 2, drive cylinder 14, drive disk 24 and reciprocal disk 26 within the tube 40 of the frame.

Figure 5C:
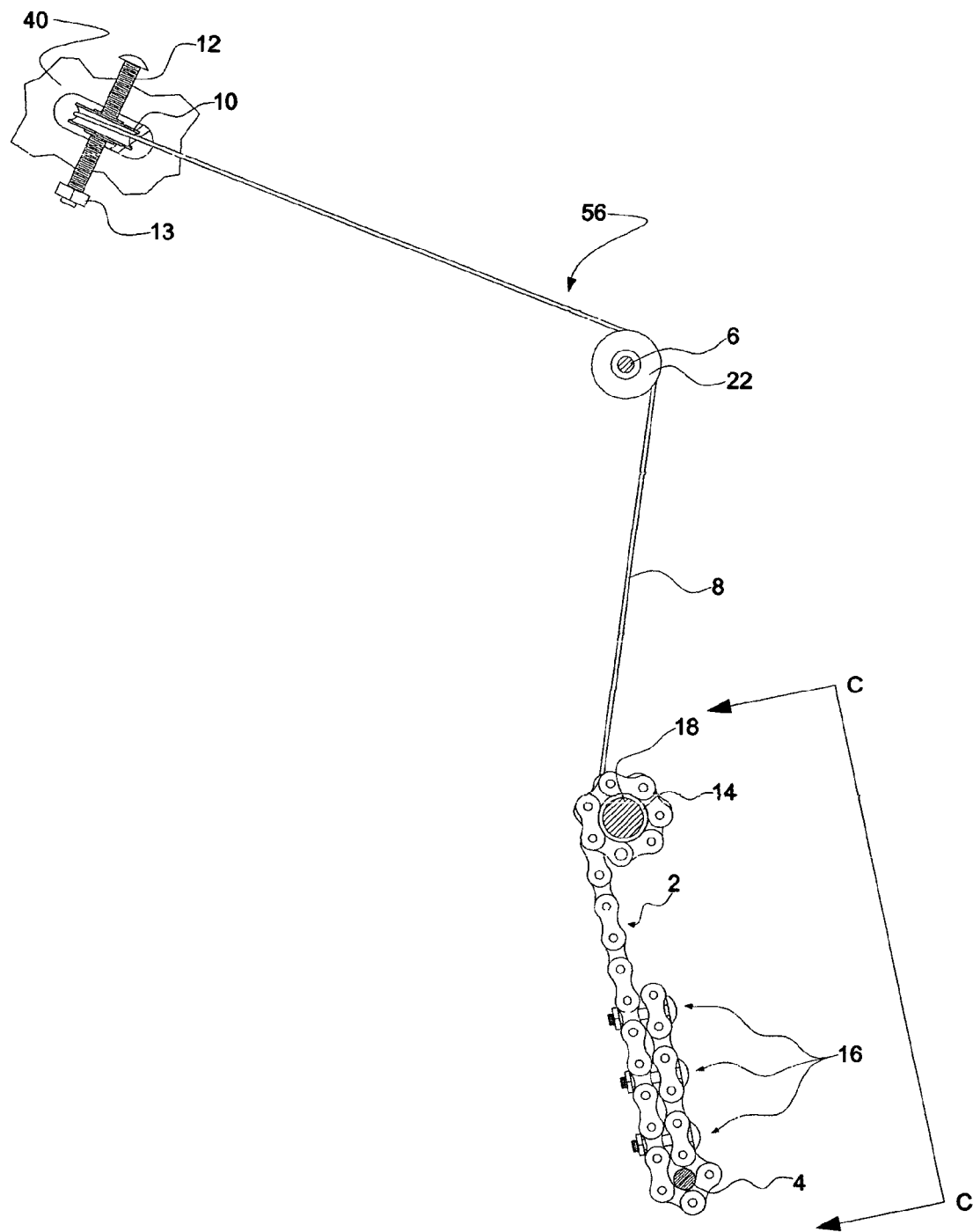

FIG. 5C illustrates an enlarged left side view of the wrap around chain propulsion system's essential mechanical components, which further illustrates the position of the transmission chain 2 before it rotates forwardly the rear wheel coupled to drive cylinder 14 it is wrapped around. From the picture, it is obvious that by pulling the drive cylinder 14 counter clockwise the reciprocal steel cable 8 connected to it would be reeled around it, thus pulling the opposite end of the steel cable 8 connected to the drive cylinder 14 on the right side which causes it to pull its member chain around its member drive cylinder 14 with rotational force.

Figure 5D:
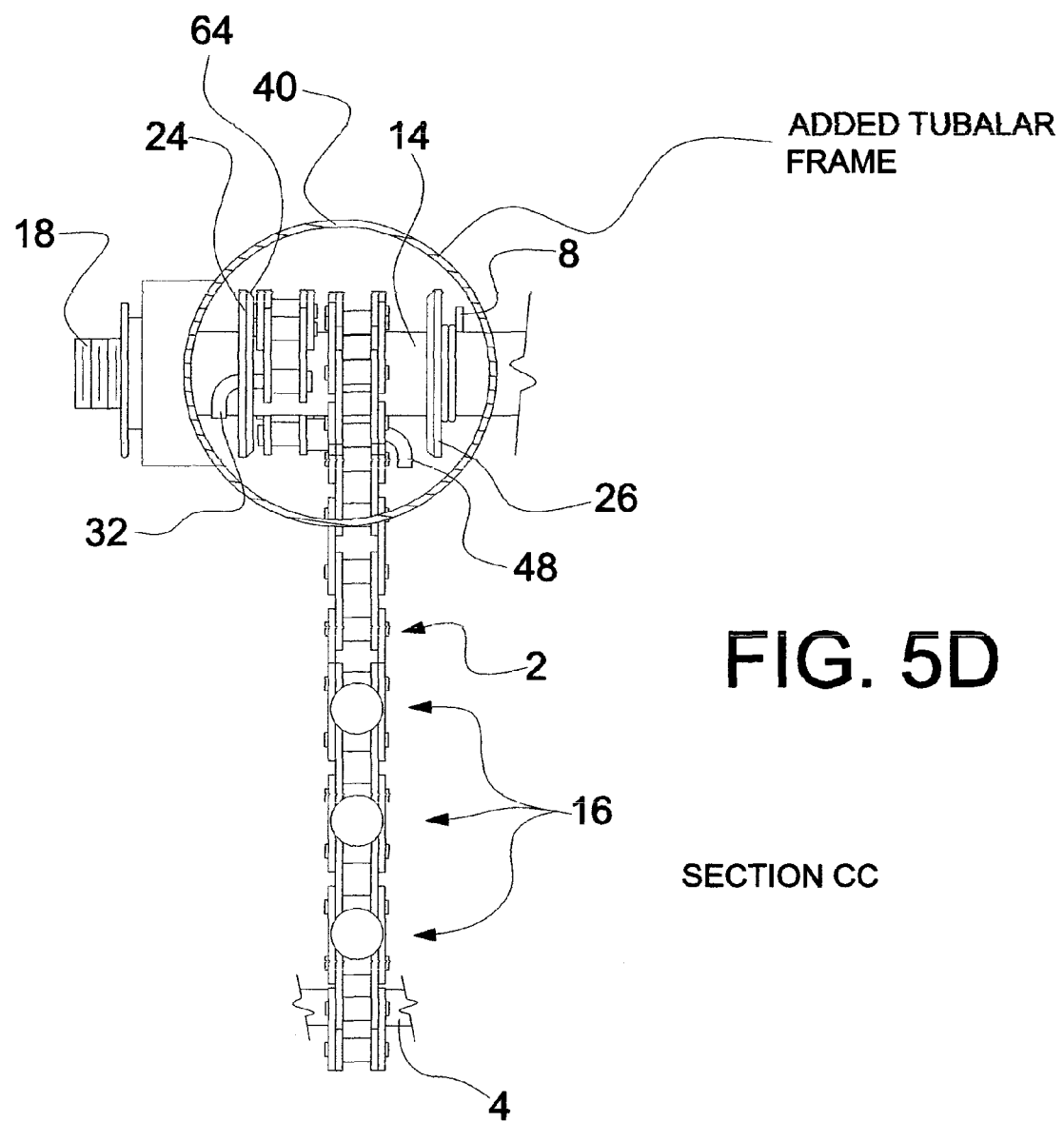

FIG. 5D illustrates the top view of the left side transmission chain 2 which shows how the leading chain 28 and longer chain 30 are not conflicting with each other after the chain assembly 2 is wrapped around the drive cylinder 14 within the tube of frame 40. It also shows how the steel cable 8 is wrapped around the drive cylinder 14 on the right side of the reciprocal disk 26. It also illustrates the beveled corner 64 of the drive cylinder 14, which is designed to facilitate the easy wrapping around of the chains 2 around the drive cylinder, by preventing the chain pins from conflicting with the drive disk 24.

Figure 6:
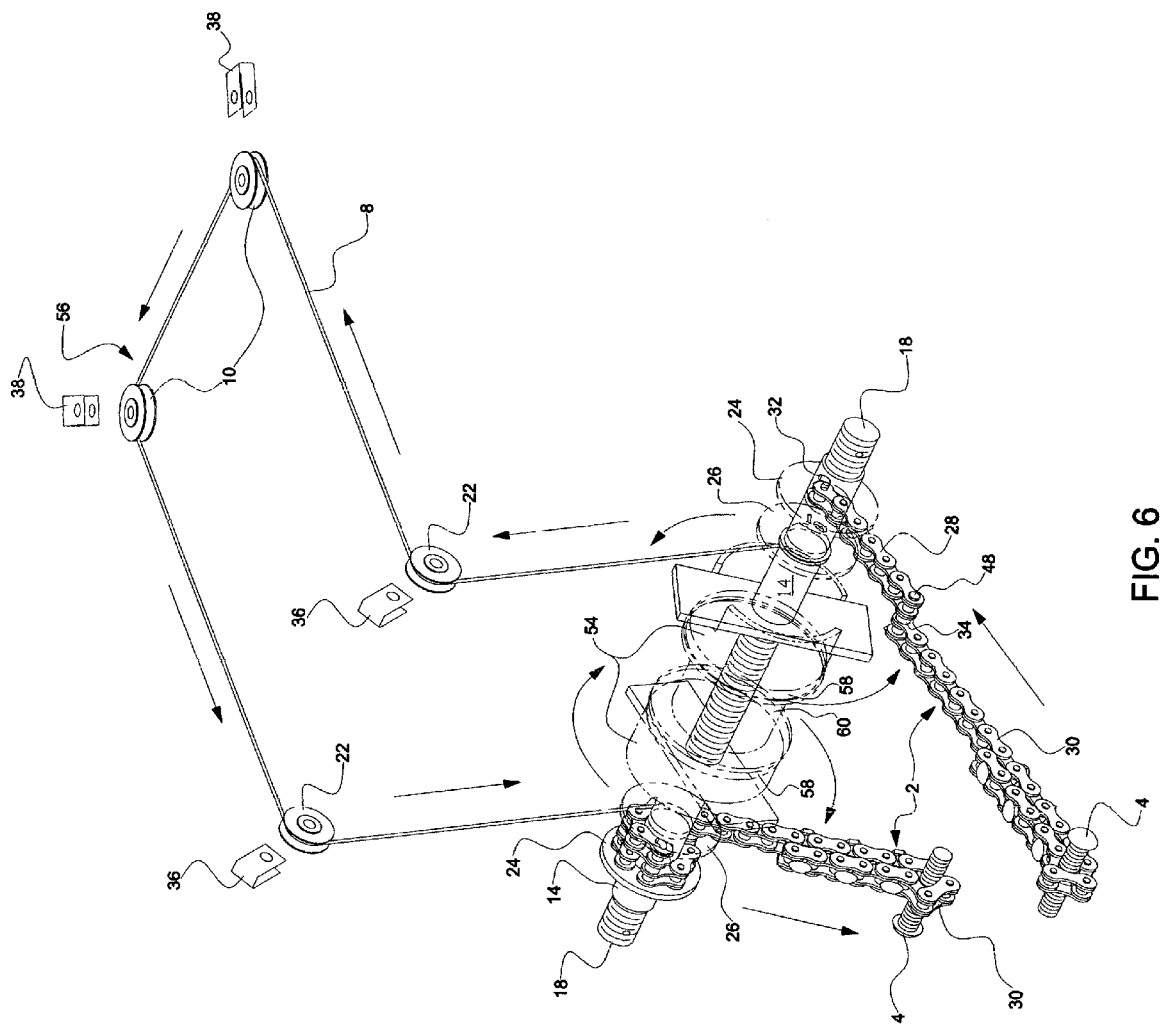

FIG. 6 illustrates the transmission chain systems 2, modified hub systems (54 & 60), rear wheel axle 18, rotational bars 52, and reciprocal system 56 and how these systems work together to produce reciprocal motion in order to forwardly propel the connected bicycle forward.

Figure 6A:
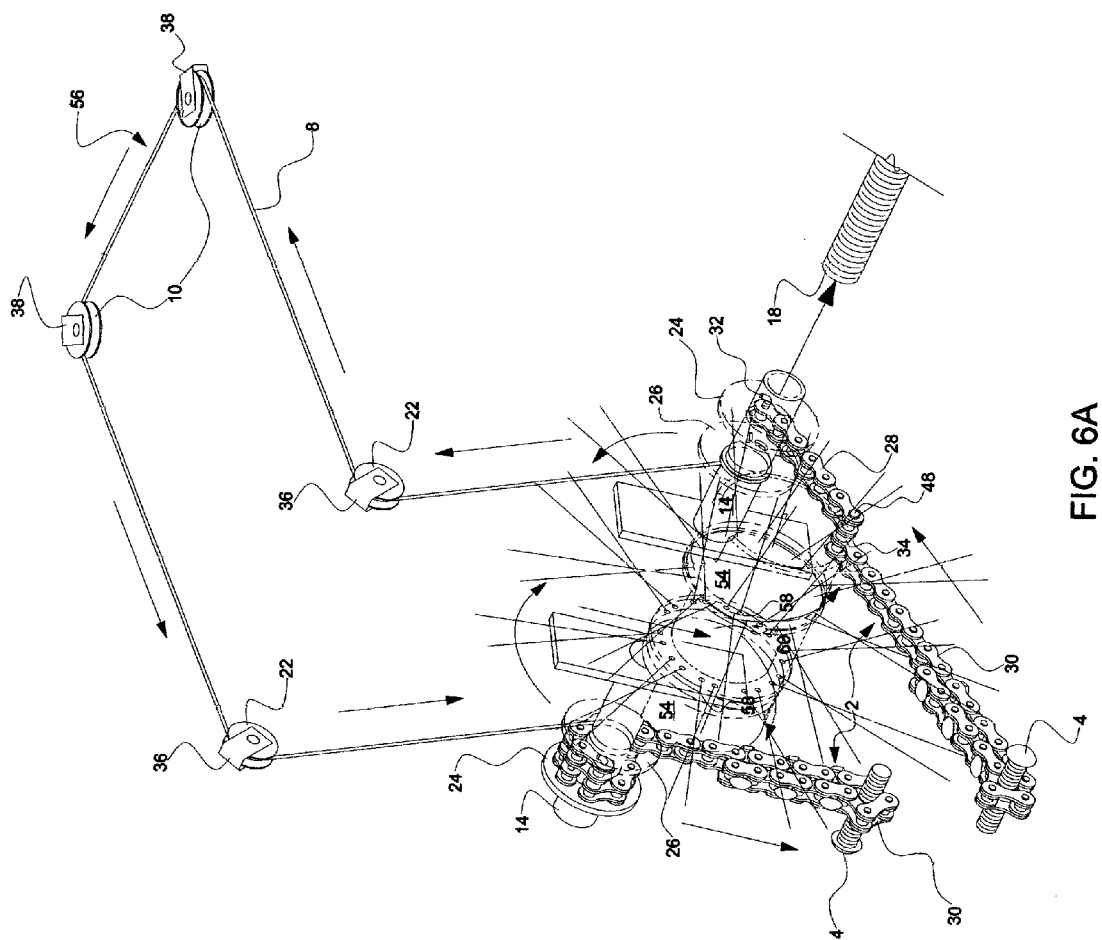

FIG. 6A illustrates how the rear wheel (including 54, 58, & 60) is removed from the transmission system. It also illustrates how the steel modified strip (36 & 38) is assembled around the pulley wheels in order to prevent the steel cable 8 from falling out of member pulley wheels (10 & 22).

Figure 7:
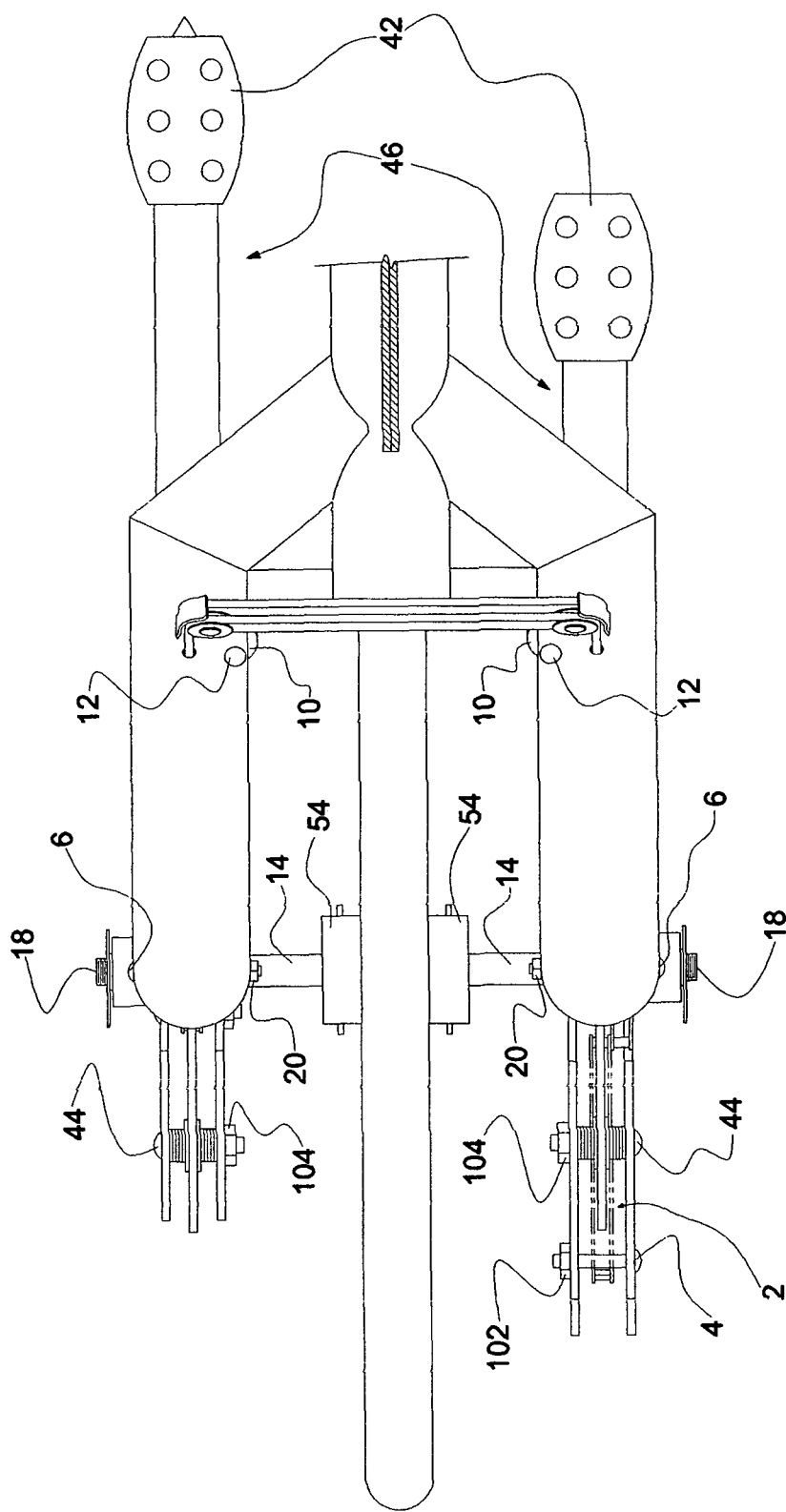

FIG. 7 illustrates the top view of the bicycle with cut off tubular frame 40 and seat post wings for a better view.

Figure 8:
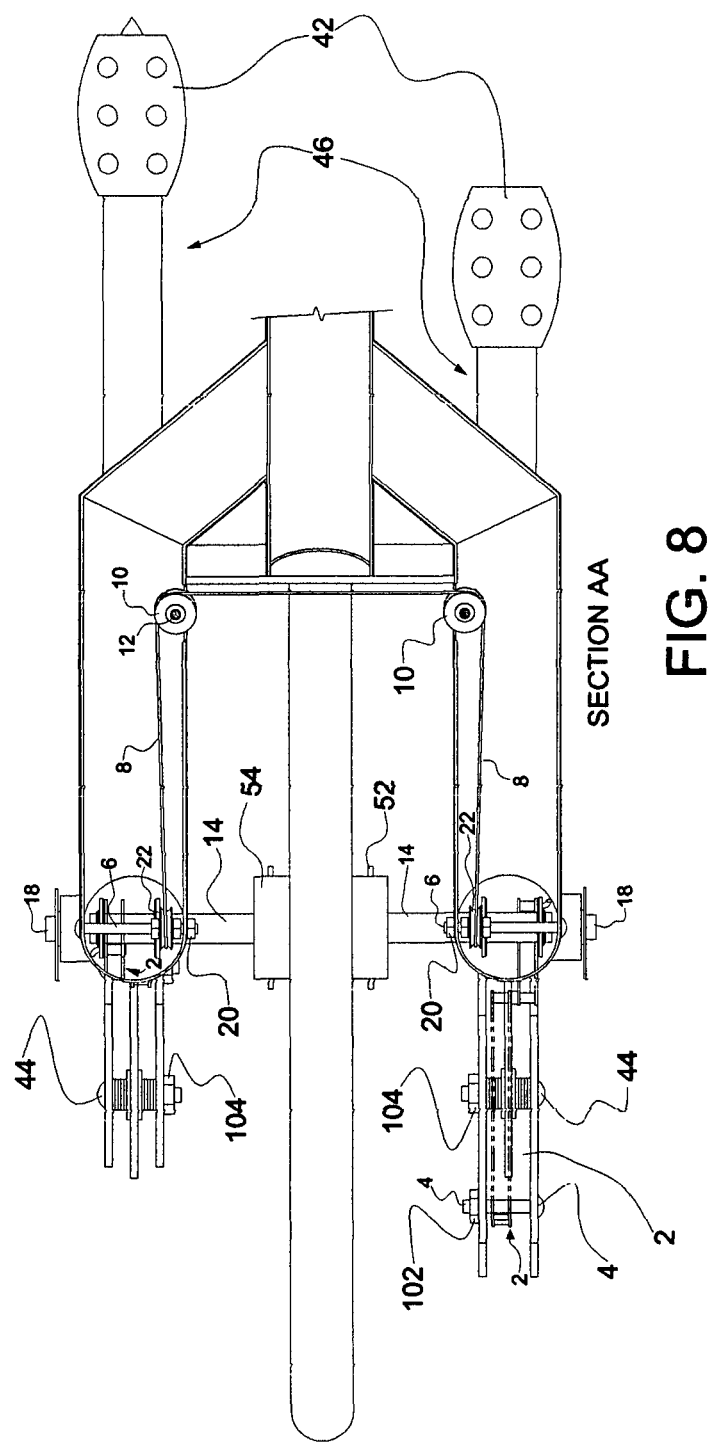

FIG. 8 illustrates the top view of the bicycle cut open with cut off frontal frame 40 in order to reveal how the mechanism components work with each other while pedaling the bicycle.

| DRAWINGS - Reference Numerals | |
|---|---|
| 2 | wrap around chain assembly |
| 4 | load bolt |
| 6 | horizontal pulley wheel bolt |
| 8 | steel reciprocal cable |
| 10 | horizontal pulley wheel |
| 12 | horizontal pulley wheel bolt |
| 13 | horizontal pulley wheel nut |
| 14 | radial drive cylinder |
| 16 | roller chain fasteners |
| 18 | rear wheel axle |
| 20 | vertical nut |
| 22 | vertical pulley wheel |
| 24 | radial chain drive disk |
| 26 | radial cable drive disk |
| 28 | leading offset chain |
| 30 | larger offset chain |
| 32 | chain drive connection means |
| 34 | chain spacer |
| 36 | vertical cable holder |
| 38 | horizontal cable holder |
| 40 | bicycle frame |
| 42 | pedal |
| 44 | fulcrum |
| 46 | lever machine |
| 48 | offset connection means |
| 50 | parallel lever plates |
| 51 | C-holder component |
| 52 | rotational steel bars |
| 54 | steel hub |
| 56 | reciprocal system |
| 58 | freestyle sprocket |
| 60 | rear wheel hub |
| 62 | outward force acting on transmission chain |
| 64 | beveled edge |
| 66 | slot for pulley wheel |
| 68 | aerodynamic tip |
| 70 | steel pin |
| 72 | bolt support |
| 74 | steel reinforcement |
| 76 | pedal mount |
| 78 | tube of lever |
| 80 | bore of pedal mount |
| 82 | bore of aerodynamic tip |
| 84 | groove of aerodynamic tip |
| 86 | bore of the lever |
| 88 | bore of steel reinforcement |
| 90 | leading bore of steel reinforcement |
| 92 | bevel of pedal mount |
| 94 | bore accommodation for load |
| 96 | bore accommodation for fulcrum |
| 98 | pedal bolt |
| 100 | pedal nut |
| 102 | load nut |
| 103 | piston rod |
| 104 | fulcrum nut |
| 105 | slots of the modified hub |

DETAILED DESCRIPTION

FIGS. 1 to 5

Figure 1:
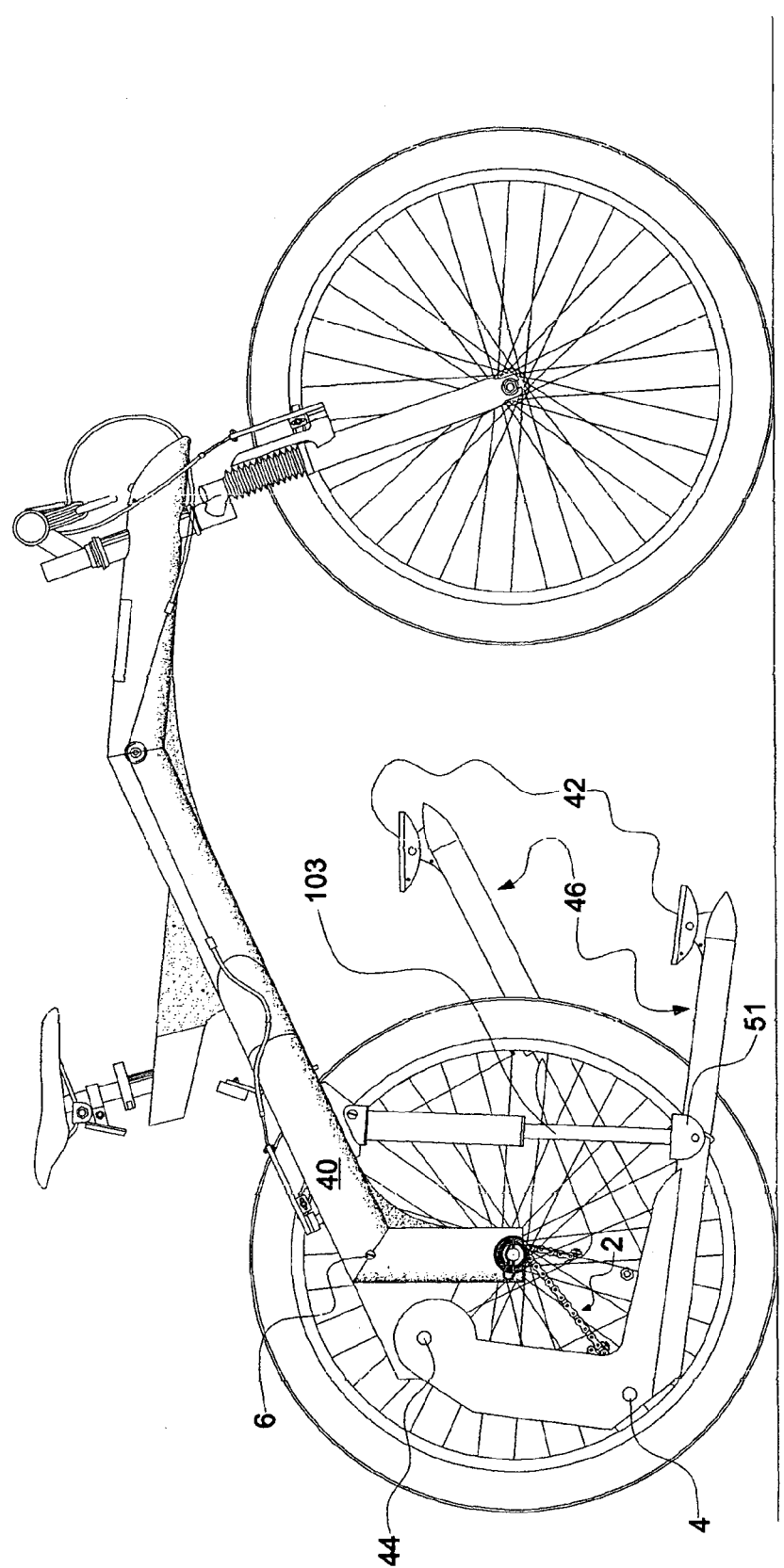
FIG. 1 illustrates a right side view of the wrap around chain propulsion system in its preferred embodiment.
Figure 2:
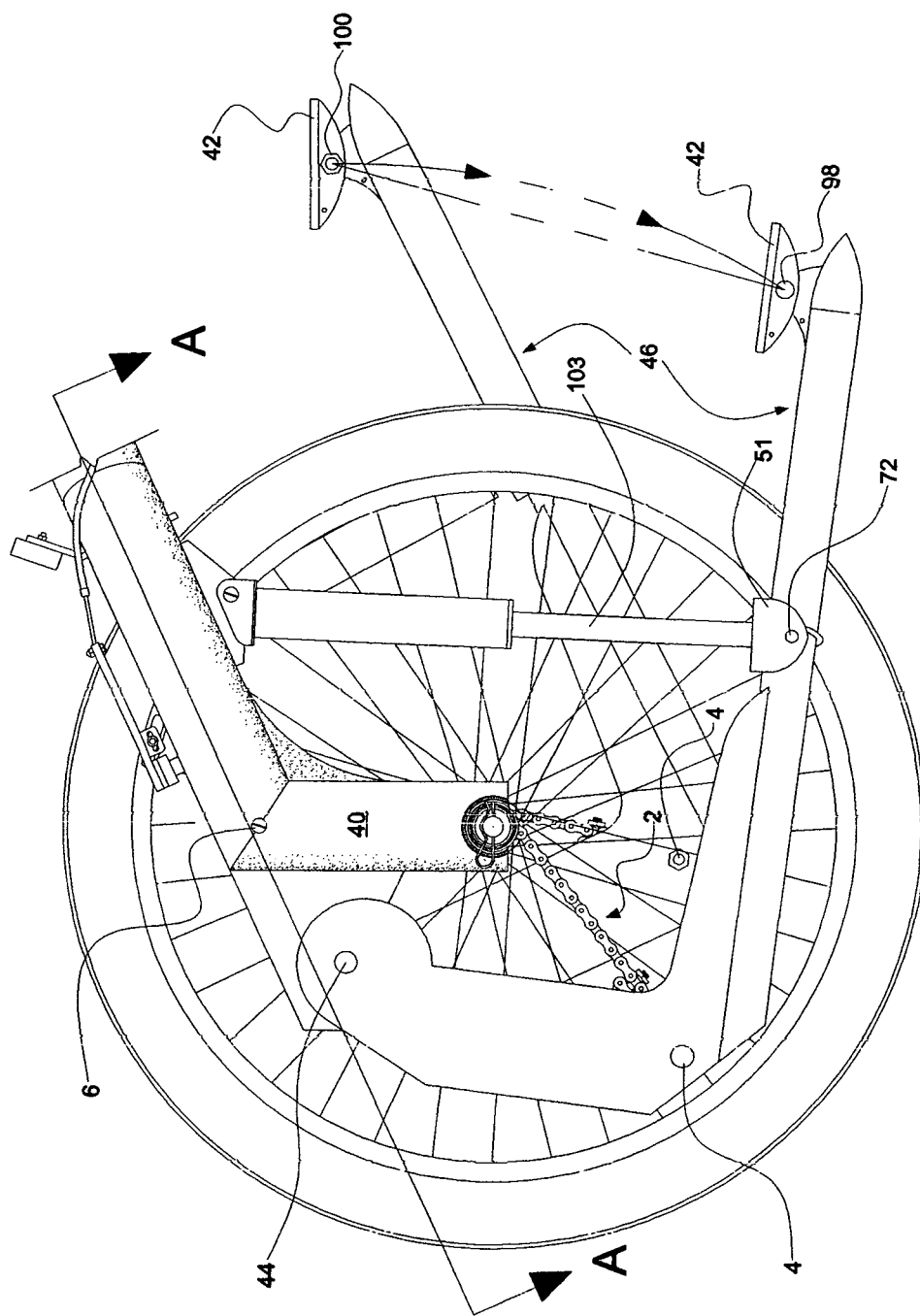
FIG. 2 illustrates an enlarged right side cut off view of the wrap around chain propulsion system.
Figure 3:
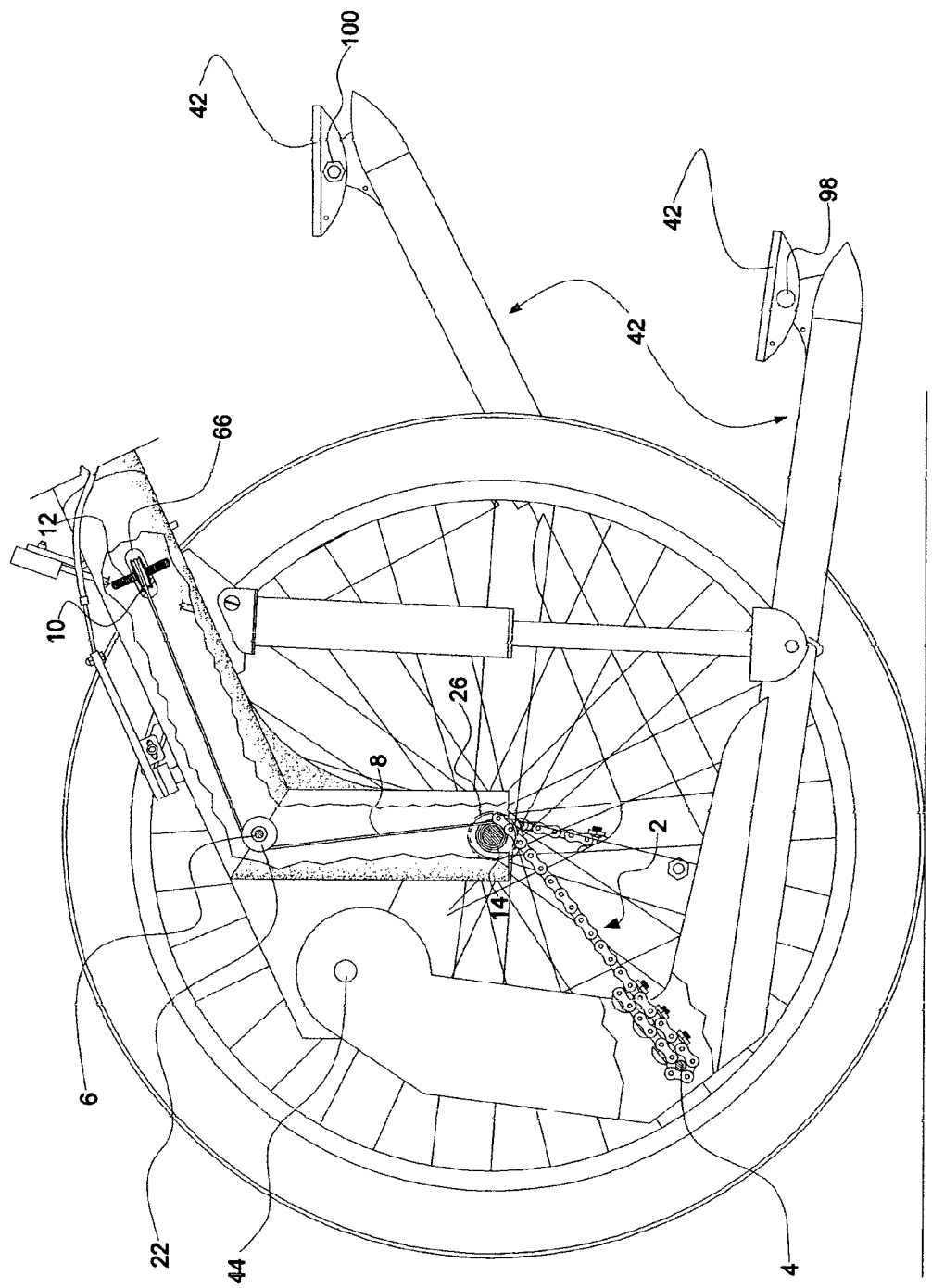
FIG. 3 illustrates an enlarged right side cut off view of the wrap around chain propulsion system with broken away views that illustrate the mechanical workings of the propulsion system.
Figure 4:
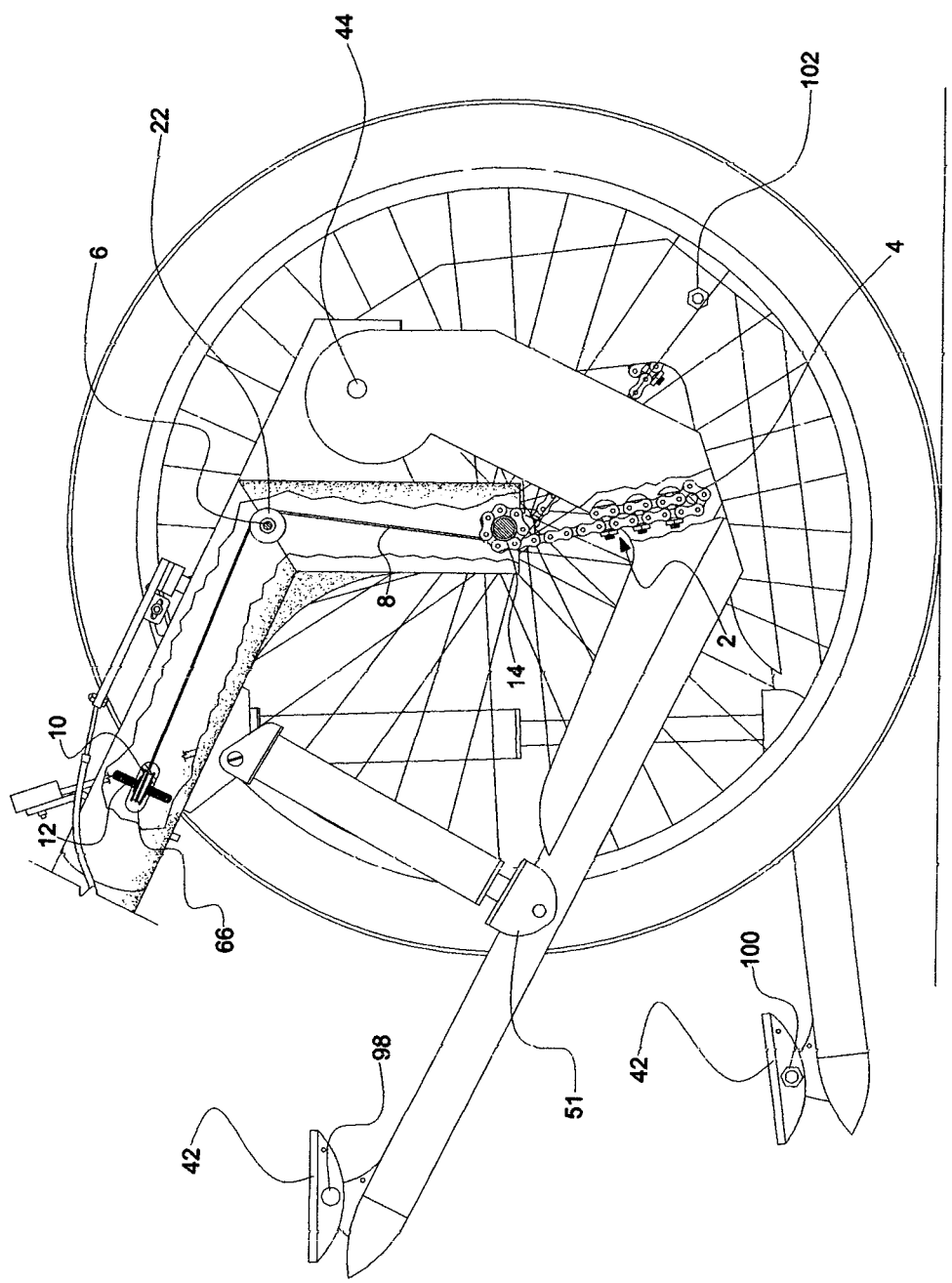
FIG. 4 illustrates an enlarged left side cut off view of the wrap around chain propulsion system with broken away views that illustrate the mechanical workings of the propulsion system.

Herein are descriptions and definitions of the concept drawings depicting the preferred embodiment of the LEPS's wrap around chain propulsion mechanism, which is illustrated in FIGS. 1 through 8. FIG. 1 illustrates a right side view of the vehicle body that structurally accommodates the wrap around chain 2 propulsion system. The roller chain 30 of said right assembly is looped around the load bolt 4 occupying the bores of parallel vertical plates 50 composing the "L" shaped levers 46. This loop allows the top rear portion of the larger chain 30 to be overlapped by its smaller portion, while the chain link spaces are aligned. At least three aligned spaces are occupied by a bolt and fastened by separate nuts 16 (FIG. 5). The larger portion of each roller chain 30 lead forward, then a smaller offset roller chain 28 is connected to the leading end of the former chain portion 30 from the side that is facing away from the rear wheel. The smaller offset roller chain 28 length is just short of the circumference length of the drive cylinder 14. This is necessary so that the ends of the shorter chain 28 do not collide with each other while it is being wrapped around the drive cylinder 14. Furthermore, the other connected larger portion of the roller chain 30 continues to wrap around the drive cylinder 14 after the smaller roller chain 28 is fully wrapped around the drive cylinder 14. This chain assembly 2 allows for a transmission means that wraps around the drive cylinder 14 at least 1 and ¾ times without chain 2 conflict Between the offset connections is a spacer 34 that prevent the chain pins from colliding with each other. The ends of the larger chain 30 and shorter chain 28 is connected by a steel rod 48 that occupy the bores of the aligned chain ends (28 & 30) and spacer 34. The ends of the steel rod 48 is held in place by a connected nail head and it's opposite end that is bent to at least a 90 degree angle (FIG. 5B).

The frontal bores of the shorter chain 28 end is aligned to the bore in the radial drive disk 24 while a steel rod 32 occupies both of them. This assembly is held in place by bending the end of the rod to at least 90 degrees while the other end is held by its nail head. The radial disk 24 has a central bore which is occupied by the drive cylinder 14. The outer bore edge of the drive disk 24 is welded to the outer corner of the drive disk 24 and contacting drive cylinder 14. Across from the drive disk 24 inward toward the rear wheel is the reciprocal disk 26 having an outer central bore edge that is welded to the outer surface of the drive cylinder 14 comprising the corner of the drive cylinder 14 and reciprocal disk 26. The reciprocal disk 26 has three bores close to the surface of the drive cylinder 14. These bores would accommodate one end of the reciprocal steel cable 8, which is about ¹⁄₁₆" in diameter. The bores are about ⅛" in diameter in order to have space for J.B. Weld resin, which would permanently bond the steel cable 8 within the holes, thus preventing slipping. Furthermore, the second assembly technique which would prevent the steel cable 8 from slipping would be how the steel cable 8 is woven back and forth through each hole (FIG. 6). This weaving of the steel cable 8 through the three bores would reinforce the J.B. Weld resin bonding the steel cable 8. As illustrated in FIG. 6, the right side roller chain system 2 and reciprocal cable 8 assembly shows the leading end of the roller chain 28 unwrapped around the drive cylinder 14, while it is coupled underneath it, while it's adjacent reciprocal cable 8 member is wrapped around the drive cylinder 14 clockwise from a right side view. The reciprocal steel cable 8 on the right is configured to pull counter clockwise the drive cylinder 14, which would then pull and wrap counter clockwise it's member transmission chain 2. The left side assembly is symmetrical to the right side assembly, however the left side reciprocal cable 8 would wrap around its member drive cylinder 14 counter clockwise (FIG. 5) from a left side view and the reciprocal steel cable 8 is configured to pull clockwise the drive cylinder 14, which would rewrap clockwise, it's adjacent member transmission chain 2 (FIG. 5). The steel reciprocal cable 8 is connected to both symmetrical assemblies.

From the right assembly it comes from being wrapped around its member drive cylinder 14, then it leads up and around forwardly into the vertical groove of its pulley wheel member 22. The steel cable 8 then leads forwardly and around to the left in the horizontal groove of its pulley wheel member 10. The steel cable 8 then lead to the left out of the right symmetrical side of the frame (FIG. 7) into to left symmetrical side of the frame 40 into a slot in the inner side of the frame 40 into a horizontal groove of member pulley wheel 10 (FIG. 7). The steel cable 8 then leads around to the left and then rearward in the groove of a member vertical pulley wheel 22. The cable 8 then leads over and downward to connect to its member drive disk 24 while being positioned in front of and underneath its member drive cylinder 14. Each pulley wheel (10 & 22) is connected within the frame of the bicycle by a bolt and nut (FIG. 7). Each pulley has an almost "U" shaped strip of metal (36 & 38) that is formed around the groove of each pulley wheel. Near the edge of these "U" shaped strips (36 & 38) of metal are bores through the surface of their parallel portions that are aligned and enable the said bolts (6 & 12) to be inserted into them as well as the bore of the pulley wheels (10 & 22). This assembly prevents the steel cable 8 from falling out of the groove of the pulley wheels (10 & 22). Consequently, this assembly maintains a reduction of friction on the movement of the steel cable 8 within the frame 40 of the bicycle. Furthermore, each vertical pulley wheel is sustained by a member bolt 6 through the bore of the pulley wheel 22 and frame 40. Said bolt 6 occupies aligned bores through the vertical surfaces of the frame's 40 tubular joint corner through the center of each tubular joint. The end of each bolt 6 faces inward towards the rear wheel and is fastened with a nut 20 (FIG. 8). Each horizontal pulley wheel 10 is partially out of the frame 40 (FIGS. 6 & 7) surface facing inwards. Each pulley wheel 10 protrudes through a slot through the side of said surfaces. Above and below each slot is a bore that is aligned to the other. Said bolt 12 occupies the align bores in the frame 40 and each member pulley wheel 10, which both pulley wheels are fastened in place with a nut 13.

The load bolt 4 is the component, in which the drive chain 2 is looped around. The load bolt 4 occupies the aligned bores 94 (FIG. 9) that are through the parallel plates of the "L" shaped lever 50. Each load bolt 4 is ⅜" in diameter, which is enough steel thickness to prevent it from bending from the multiplied pulling tension generated by the force of member lever machines 46. The end of each load bolt 4 points inwards towards the rear wheel of the LEPS. Each end is fastened in place with a nut 102. The load bolt 4 represents the load, which is a basic component of a lever machine, which includes three other elements, the lever, the area of applied force and the fulcrum. The load bolt 4 is positioned on each lever machine 46 more than twice the distance away from the area of applied force (pedal 42) than it is to its member fulcrum 44 component. This lever component configuration complies with the definition of a lever machine having true mechanical advantage.

Furthermore, a rotational steel beam 52 is welded to the inner facing edges of each drive cylinder 14. The rotational steel beams 52 are supposed to be rotated forwards and backwards in a reciprocal motion. Thus, when the rider presses on the L-shaped lever and pulls the transmission chain 2, the rotational bar 52 is rotated forward while the steel cable 8 is reeled in and pulls the opposite side drive cylinder 14 which reels in its member transmission chain 2 and pulls the drive cylinder 14 in a backwards rotation. When the opposite lever machine from the first mentioned one is pressed downwards, the same reaction takes place, but with the opposite drive cylinder 14 and transmission chain 2 (FIG. 6). Furthermore, the rear wheel connected to the modified hub (54 & 60) is able to be dropped out easily simply by removing the axle 18 of the rear wheel as illustrated in FIG. 6A. Once the axle is removed the open ended slots 105 must be aligned so that all four are allowing either rotational beams 52 to point upwards or 90 degrees. The rear wheel with the connected modified hub (54 & 60) is to be slid downward (FIG. 6A) until the wheel is free of the frame 40. This should be done after the rear breaks are loosened to allow the tire to pass through. This type of rear wheel release would allow for easy maintenance of the rear wheel.

Operational Description FIGS. 1-8

The manner of how the LEPS's wrap around chain propulsion system works can be illustrated in FIGS. 1 to 8. When the rider presses down on the pedal 42, the portion of the drive chain that is wrapped around its member drive cylinder 14 pulls the drive disk 24 and drive cylinder 14 in a circular forward motion while at the same time reeling in the steel cable 8 adjacently connected to the reciprocal disk 26. This steel cable 8 is also in contact with the drive cylinder 14 and it is reeled in around the drive cylinder 14 as the drive chain 2 is unwrapped due its rearward pulling by its member lever machine 46. The inner end of the drive cylinder 14, facing the rear wheel, connected to the perpendicular bar of steel 52 rotates forwardly the steel hub 54 connected to member freestyle sprocket 58. The freestyle sprocket 58 rotates forwardly the hub 60 connected to the rear wheel, which propels the bicycle forward. The reeling in of the steel cable 8 produces a strong pulling force on the cable 8, which causes the cable portion on the opposite symmetrical side of the frame 40 to be pulled and unreeled. It further causes the drive chain 2 connected to the drive disk 24 to be wrapped around it's member drive cylinder 14, by pulling said drive cylinder 14 in a circular motion that wraps the drive chain 2 around it's member drive cylinder 14. After the drive chain 2 around said drive cylinder 14 is fully wrapped, the propulsion process as firstly described is set in the same motion when its member pedal 42 is depressed by a rider's foot.

Other Mechanical Reactions

When a drive chain 2 is pulled by it's member lever machine 46, the portions of shorter chain links 28 that are rearward want to swing outward 62 (FIG. 5B), but these links are steadily held in place by the wall of it's member drive disk 24, as well as the rigid ness of it's chain link formation and the steel rod 32 that connects the first chain link bore to the drive disk 24. Furthermore, the inner edge of the member drive disk 24 would have a beveled edge 64 (FIG. 5B) for allowing the outer surfaces of the short leading chain portion 28 to slide against the inner surface of it member drive disk 24 without it's chain link pins conflicting with the inner edges of the member drive disk 24. This ability of the shorter leading chain portion 28 to significantly stay straight while multiplied force is pulling on it, would also allow the larger connected offset chain 40 portions to also maintain a straight position in reference to its parallel lever 46 components.

I claim:

1. The transmission chain propulsion system of a human propelled bicycle that is pulled by lever machines, wherein the improvement comprises:
    a right and left side chain that is configured to wrap around a separate radial drive member of a bicycle, wherein each radial drive member is coupled to the rear wheel of said bicycle with slip lock forward driven connection;
    said right and left side chain that is configured to wrap around the diameter of its radial drive member at least 1¾ revolutions without wrapping around itself;

said right and left side transmission chain system having means to pull and rotate it's connected radial drive member, while reeling a connected cable member around said radial drive member.

2. A right and left side transmission chain system as defined in claim 1, wherein each has a chain member with means to be wrapped around a separate radial drive member by the pulling of a connected cable member that is wrapped around said right radial drive member and said left radial drive member.

3. A right and left side transmission chain as defined in claim 1, wherein each chain assembly has a radial drive end connected to a set of linear chain links that is offset by a spacer means in connection to another set of linear chain links having an opposite end that is connected to a lever machine.

4. A transmission chain propulsion system as defined in claim 1 having an axle that can be pulled out of the bores of each said radial drive member, allowing the drop out removal of said rear wheel.

* * * * *